United States Patent [19]

Nalley

[11] 4,262,420
[45] Apr. 21, 1981

[54] CROSSHEAD FOR SABRE SAWS AND SABRE SAWS INCORPORATING SAME

[75] Inventor: David J. Nalley, Liberty, S.C.

[73] Assignee: The Singer Company, Stamford, Conn.

[21] Appl. No.: 103,662

[22] Filed: Dec. 14, 1979

[51] Int. Cl.³ ............................................. B27B 19/00
[52] U.S. Cl. ......................................... 30/392; 74/50
[58] Field of Search ................ 30/392, 393, 394, 272; 74/50

[56] References Cited

U.S. PATENT DOCUMENTS

| 2,970,484 | 2/1961 | Springer | 74/50 |
| 4,206,657 | 6/1980 | Palm | 74/50 |

Primary Examiner—Jimmy C. Peters
Attorney, Agent, or Firm—Elliot A. Lackenbach; Robert E. Smith; Edward L. Bell

[57] ABSTRACT

A crosshead for a scotch yoke mechanism is formed from a generally rectangular blank of sheet steel provided with a generally oval, straight sided opening extending generally transversely medially thereof and a pair of generally circular openings centered and spaced apart from each of the oval opening straight sides, the blank being formed, as on a four slide forming machine generally around two generally parallel lines each being generally extensions of the oval opening straight sides to provide top and bottom generally parallel panels defining a closed end guide track having parallel sides and positioning the generally circular openings in the top and bottom panels and in line to be threaded on a generally cylindrical tubular saw bar of a sabre saw, the blank being further formed to tubular configuration of generally rectangular cross-section by two further parallel bends closing the crosshead on a fourth side on the side of the saw bar opposite the guide track opening. The crosshead is povitally mounted on the saw bar, a pair of low mass snap or clinch rings disposed in annular grooves on the saw bar on opposite sides of the crosshead adjacent the top and bottom panels.

6 Claims, 3 Drawing Figures

U.S. Patent  Apr. 21, 1981  4,262,420
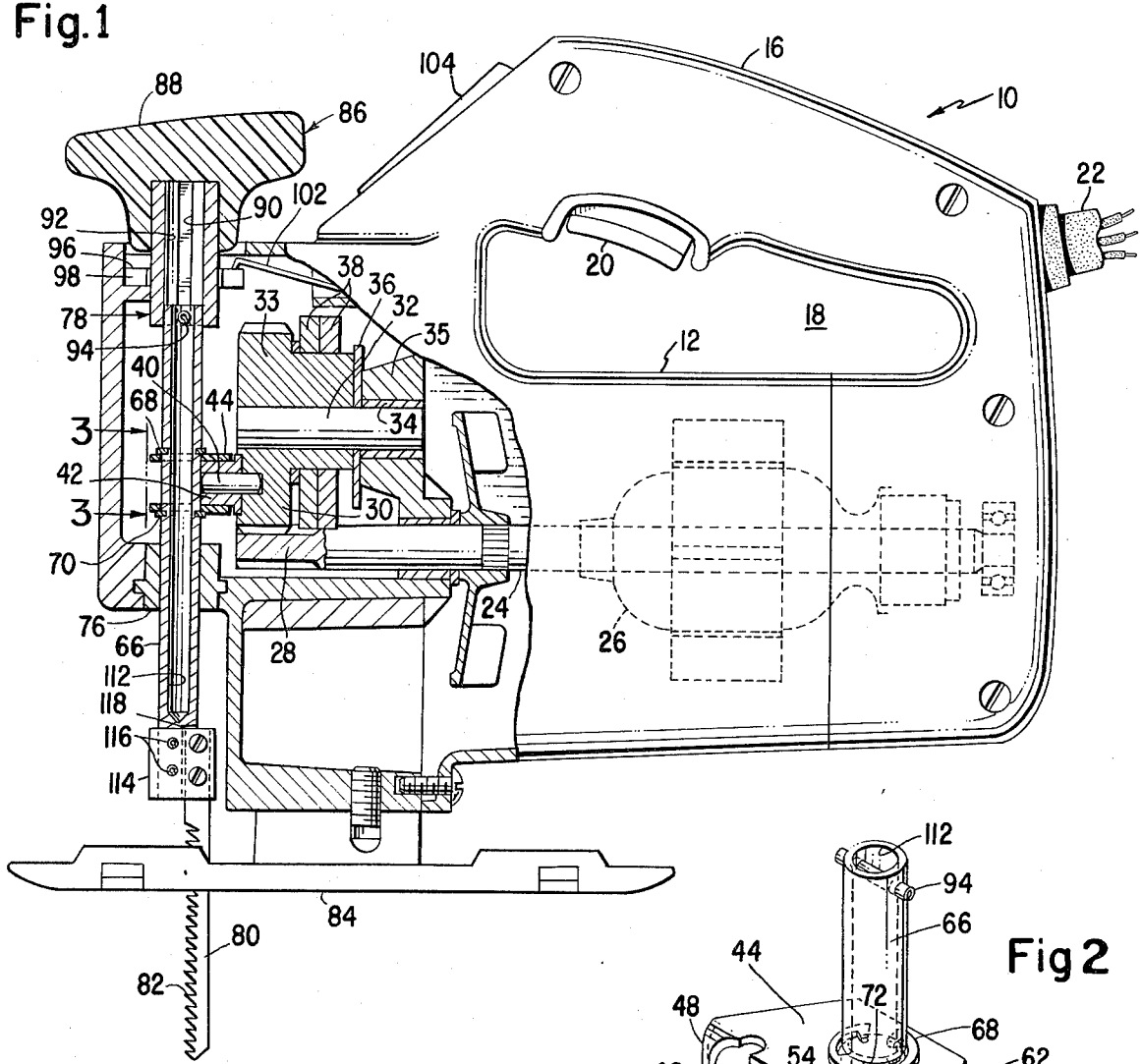
Fig.1
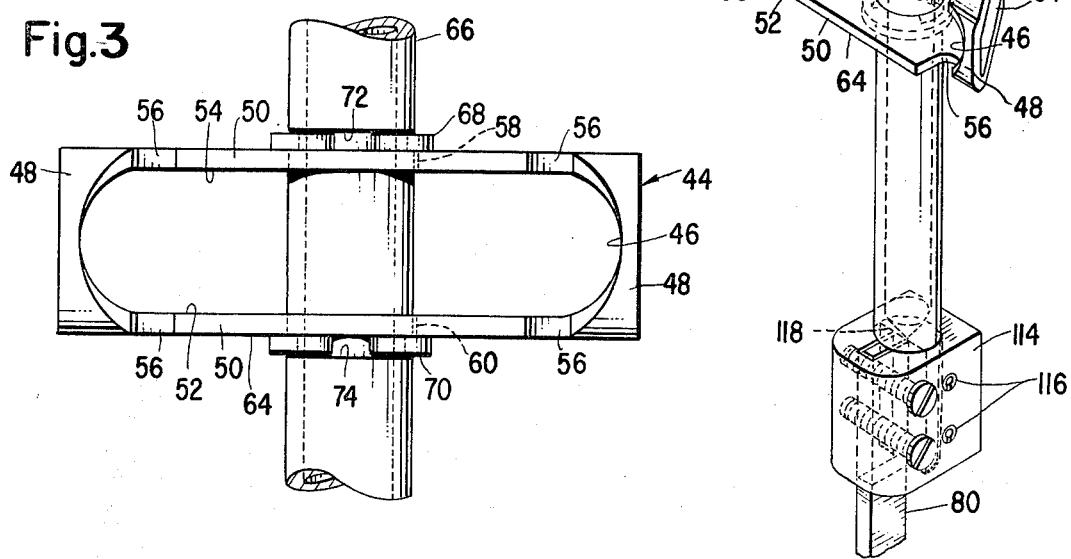
Fig.2
Fig.3

CROSSHEAD FOR SABRE SAWS AND SABRE SAWS INCORPORATING SAME

DESCRIPTION

BACKGROUND OF THE INVENTION

1. Field of the Invention

This invention relates to power operated sabre saws and, more particularly, to a novel and improved crosshead forming part of a scotch yoke mechanism for reciprocating the saw bar thereof.

2. Description of the Prior Art

Sabre saws, and especially general purpose electrically driven sabre saws for use by craftsmen and handymen have become popular and versatile tools for cutting wood, light sheet metal, plastic, composition board, and the like. Such saws are known comprising a generally cylindrical housing containing a built-in electric motor which drives a reduction gear train to rotate an eccentric crank pin which in turn is operatively associated with a crosshead mounted for movement with an elongated saw bar in turn journalled for reciprocatory movement generally perpendicular to the motor axis. Because the reciprocation of the saw bar and crosshead provides a rapidly varying load to the motor and substantial vibration, various schemes have been devised in attempts to reduce the vibration and load variation associated with the reciprocation of the saw bar.

In order to resist the shock and inertial forces imposed upon the crosshead from the rapid changes in direction, the crosshead needs to be relatively strong, rigid and tough. Generally, this has been achieved by machining the crosshead from solid metal stock, which is a relatively expensive process and results in a crosshead of relatively large mass, exacerbating the vibration and shock loading accompanying the reversals of movement of the saw bar. It has been generally believed that a saw bar crosshead could not successfully be formed from sheet stock, by bending, having sufficient rigidity, toughness and strength to withstand for an economically worthwhile period of time the shock, stress and vibration.

OBJECTS OF THE INVENTION

Bearing in mind the foregoing, it is a primary object of the present invention to provide novel and improved sabre saws incorporating a saw bar crosshead of low mass that is yet sufficiently strong, tough and rigid as to operate satisfactorily over long periods of time.

Another primary object of the present invention, in addition to the foregoing object, is the provision of a novel and improved saw bar crosshead of minimal mass which is yet sufficiently strong, rigid and tough as to be durable and effective in use over a long period of time.

Yet another primary object of the present invention, in addition to each of the foregoing objects, is the provision of novel and improved sabre saws incorporating novel and improved saw bar crossheads formed of punched and bent sheet stock.

Yet another primary object of the present invention, in addition to each of the foregoing objects, is the provision of such a novel and improved saw bar crosshead of punched and formed sheet stock.

Another and still further primary object of the present invention, in addition to each of the foregoing objects, is the provision of novel and improved saw bar and crosshead assemblies of reduced mass, which are durable and efficient in use, wherein the cross head is of punched and formed sheet steel stock, wherein the saw bar is rotatable relative the crosshead for enabling scroller and auto-scroller action of the saw bar.

Another and yet still further primary object of the present invention, in addition to each of the foregoing objects, is the provision of novel and improved sabre saws of increased efficiency and exhibiting reduced vibration.

Another and yet still further primary object of the present invention, in addition to each of the foregoing objects, is the provision of novel and improved sabre saws incorporating novel and improved crossheads formed from sheet steel stock wherein the crosshead comprises a guide track defined by a generally oval aperture through a side of the crosshead whereby the track is closed at the ends by bridges which aid in resisting widening of the track in use.

It is a feature of the present invention that, while in exemplary form it has been applied to a hand held, portable electric sabre saw, the invention may also be applied to table sabre saws, filing machines, electric knives, and other reciprocatory machines.

The invention resides in the combination, construction, arrangement and disposition of the various component parts and elements incorporated in improved sabre saws and the like and in crossheads therefor in accordance with the principles of this invention. The present invention will be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

SUMMARY OF THE INVENTION

In accordance with the present invention, a crosshead for a scotch yoke mechanism is formed from a generally rectangular blank of sheet steel punched or otherwise provided with a generally oval, straight sided opening extending generally transversely medially thereof and a pair of generally circular openings centered and spaced apart from each of the oval opening straight sides, the blank being bent or formed generally along two generally parallel lines each being generally extensions of the oval opening straight sides to provide top and bottom generally parallel panels defining a closed end guide track having parallel sides and positioning the generally circular openings in the top and bottom panels and in line to be threaded on a generally cylindrical tubular saw bar of a sabre saw, the connecting panel defining the guide track opening. The crosshead may be pivotally mounted on such a saw bar, as by a pair of low mass snap or clinch rings disposed in annular grooves on the saw bar on opposite sides of the crosshead adjacent the top and bottom panels.

DESCRIPTION OF THE DRAWING

While the specification conclude with claims particularly pointing out and distinctly claiming the subject matter which is regarded as forming the present invention, it is believed the invention will be better understood from the following detailed description when taken in conjunction with the annexed drawing which discloses, illustrates and shows a preferred embodiment or modification of the present invention and what is presently considered and believed to be the best mode of practicing the principles thereof and wherein:

FIG. 1 is a side elevational view, partially broken away, of a sabre saw incorporating a saw bar and cross head in accordance with the present invention;

FIG. 2 is an enlarged isometric illustration of the saw bar, cross head and saw blade chuck assembly of the sabre saw of FIG. 1; and FIG. 3 is an enlarged front elevational view of the cross head and adjacent portions of the saw bar of the preceeding figure, viewed generally along the line 3—3 of FIG. 1.

DETAILED DESCRIPTION OF THE INVENTION

With reference now to the drawing, and particularly to FIG. 1 thereof, there is shown and illustrated therein a novel and improved sabre saw constructed in accordance with the principles of the present invention and designated generally by the reference character 10.

The sabre saw 10 comprises a motor housing portion 12, a front or drive housing portion 14 and a handle portion 16 of integral construction and defining a hand grip opening 18 generally beneath the handle portion 16 which, as shown, extends generally above the motor housing portion 12. Within the handle portion 16 and extending downwardly into the hand grip portion 18 is a trigger switch control 20 which, as will be appreciated by those having a skill in the art, may be an ON/OFF switch or a variable speed control switch and which, when squeezed by an operator's forefinger is effective to operate the sabre saw 10. Also extending from the rear of the handle housing portion 16 is a power cord 22.

A shaft 24 of a driving electric motor indicated generally by the reference character 26 and mounted within the motor housing portion 12 extends into the front housing portion 14 and is formed with a splined portion 28. The splined portion 28 meshes with and drives a gear 30 fast on a stub shaft 32 journalled, as by means of a bearing 34 mounted within the front housing portion 14 as in a boss 35 and separated therefrom, as by a thrust washer 36. The gear 30 is integrally formed with an eccentric crank 33 which carries one or more, for example two, eccentrically mounted counter weights 35, separated from the gear teeth, as by a thrust washer 38 and slidably retained against rotation, as by guide pins (not shown) also mounted with the housing. The gear 30 also carries an eccentric pin 40 180° out of phase with the counter balance eccentric 33 and weights 35. The eccentric pin 40 is in turn surrounded by a roller 42 which engages a crosshead 44, perforated and formed as more particularly pointed out hereafter and defining with the eccentric pin 40 and roller 42, a scotch yoke mechanism.

The crosshead 44 is fabricated of a generally rectangular blank of sheet steel, or the like, perforated and formed into a generally U-shaped configuration. The crosshead 44 has a central transverse opening 46 of generally oval configuration having rounded ends defining bridging members 48 and a generally central portion defined by a pair of generally linear edges 50 defining a straight slide portion formed by generally flat track surfaces 52 and 54. Adjacent the ends of the linear edges 50 the crosshead 44 is provided with notches 56 separating the track surfaces 52 and 54 from the bridge portions 48. A pair of aligned generally circular holes 58 and 60 are provided in the top and bottom panel 62 and 64, respectively, of the crosshead 44 perpendicular to the transverse oval opening 28 of a circular diameter just slightly larger than the cross sectional diameter of a generally cylindrical, generally tubular saw bar 66 which extends therethrough.

The saw bar 66 is free to turn about its axis within the holes 58 and 60 of the crosshead 44, but is held axially captive by a pair of annular clinch rings or snap rings 68 and 70, respectively, disposed above and below the cross head 44 and engaged within annular grooves 72 and 74, respectively, provided above and below the cross head 44 on the saw bar 66. As will be appreciated, the rings 68 and 70 comprise a very low mass means for retaining the crosshead 44 in position on the saw bar 66. The saw bar 66 is journalled for linear movement in a sleeve bearing 76 secured in the bottom portion of the front housing portion 14 and a journal bushing 78 secured in the top of the front housing portion 14 and rotatable therein.

Upon operation of the sabre saw, the motor shaft 24 will drive the gear 30 which, through pin 40 and roller 42 working in the crosshead 44, transmits linear axial reciprocatory motion to the saw bar 66 and drives an affixed saw blade 80 having a cutting edge 82 in a linear reciprocatory path substantially normal to the plane of a work-contacting shoe 84.

Means, in the form of a control knob assembly designated generally by the reference character 86, is provided for selectively and manually controlling the angular position of the saw bar 66 while it is reciprocating to provide the cutting stroke of the saw blade 80. The control knob assembly 60 includes the journal bushing 78 to which is affixed a control knob 88 by means of a set screw, not shown. The journal bushing 78 has internal diametrically positioned slots 90 communicating with a central aperture 92 in which the upper end portion of the saw bar 66 reciprocates. A pin 94 is secured to the upper end portion of the saw bar 66 in sliding engagement with the slots 90. The pin 94 is preferably secured to the saw bar 66 in such a position that its axis lies perpendicular the plane of the saw blade 80.

The sabre saw 10 further comprises means for selectively locking the control assembly 86 and saw bar 66 against rotation and may comprise, for example, an annular collar 96 extending radially outwardly of the bushing 78 generally coaxial with the aperture bore 92 and provided with a plurality, such as four, axial peripheral slots 98 disclosed 90° apart, two in line with and two perpendicular to the pin 94 for selective engagement and disengagement with a latch comprising, for example, a leaf spring 102 cantelevered from the housing and controlled by means of a trigger slide 104, all as described in more detail in my copending application Ser. No. 137,928, filed Apr. 7, 1980, and incorporated herein by reference as fully and completely as if reproduced hereat.

As heretofore pointed out, the crosshead 44 is formed from a blank of sheet stock, such as sheet steel and is perferably hardened and tempered so as to be tough, strong and rigid and perferably is formed after being punched with the oval aperture 46, notches 56 and the two round holes 58. The blank may be clamped in position and then bent so that the upper and lower panels 62 and 64 are generally parallel and spaced apart at the ends of the bridges 48 at the ends of the oval aperture 46 to thereby define the track surfaces 52 and 54 generally flat and parallel. The cross head 44 may, for example, be formed of AISI 1050 spring steel hardened to Rockwell "C" 45–50.

To further reduce mass of the saw bar assembly, so as to minimize vibration and loading of the bearings and motor by the reciprocation thereof, the saw bar 66 may be made hollow, as by a drilled bore 112 extending substantially axially thereof to adjacent the saw chuck collar 114 which, as described in more detail in my copending application Ser. No. 137,928, filed Apr. 7, 1980, and incorporated herein by reference as fully and completely as if reproduced hereat, may be made of aluminum and secured onto the saw bar 66, as by one or more pins 116. To cooperate with the saw chuck 114, the lower end portion of the saw bar 66 may be provided with a square shouldered generally chordal notch 118. The crosshead 44 may be further reduced in its mass by cutting the upper and lower panels 62 and 64 to generally trapezoidal configuration, as shown.

While the invention has been described, disclosed, illustrated and shown in terms of a preferred embodiment or modification which has assumed in practice, it is to be expressly understood that this has been done for purpose of example only and that the invention is not intended to be deemed limited thereby, and that other embodiments and modifications that may be suggested to those having the benefit of the teachings herein are intended to be reserved especially if they fall within the scope and spirit of the claims here appended.

I claim:

1. For use in a sabre saw, or the like having a scotch yoke mechanism operated by a motor for reciprocating a saw bar, a crosshead in the scotch yoke mechanism formed of sheet stock to a configuration providing a closed straight track perpendicular the saw bar and having bridges across the ends of said track said crosshead being of a generally U-shaped configuration having a pair of generally parallel top and bottom panels extending generally perpendicular a bridging panel thereof with said track being defined by said top and bottom panels and passing through said bridging panel, said top and bottom surfaces being provided with generally central circular holes through which such saw bar may pass.

2. A sabre saw, or the like comprising, in combination, a housing having an electric motor therewithin with a rotating output shaft, a saw bar slidably journalled in said housing and extending outwardly thereof for reciprocating a saw blade or the like attached thereto, a gear train journalled within said housing for rotation by said output shaft and a scotch yoke mechanism operatively associated between said saw bar and said gear train, said scotch yoke mechanism comprising an eccentric pin driven for orbital movement about an axis generally perpendicular said saw bar and a crosshead carried by said saw bar having a track for engaging, directly or indirectly, said eccentric pin, said orbital movement of said eccentric pin providing reciprocating movement of said saw bar and crosshead, said crosshead being formed of sheet stock to a generally U-shaped configuration having a pair of generally parallel top and bottom panels extending generally perpendicular a bridging panel thereof with said guide track being defined by said top and bottom panels and passing through said bridging panel, the ends of said bridging panel defining bridges adjacent the ends of said guide track, said top and bottom surfaces being provided with generally central circular holes through which said saw bar passes together with snap or clinch rings above and below the crosshead engaged in annular grooves on the saw bar whereby said crosshead and saw bar are relatively rotatable and precluded from relative longitudinal sliding movement.

3. Sabre saw defined in claim 2 wherein said guide track is formed by an oval aperture in one face thereof said aperture having its long sides generally straight and parallel and in the plane of the adjacent said top and bottom panels.

4. Sabre saw defined in claim 3 wherein each of said top and bottom panels is of generally trapezoidal configuration.

5. A crosshead for a scotch yoke mechanism formed from a generally rectangular blank of sheet steel punched or otherwise provided with a generally oval, straight sided opening extending generally transversely medially thereof and a pair of generally circular openings centered and spaced apart from each of the oval opening straight sides, the blank being formed generally around two generally parallel lines each being generally extensions of the oval opening straight sides to provide top and bottom generally parallel panels defining a closed end guide track having parallel sides and positioning the generally circular openings in the top and bottom panels and in line to be threaded on a generally cylindrical tubular bar.

6. Crosshead defined in claim 5 pivotally mounted on a saw bar of a sabre saw, by a pair of low mass snap or clinch rings disposed in annular grooves provided on said saw bar on opposite sides of said crosshead adjacent said top and bottom panels.

* * * * *